Figure 1:
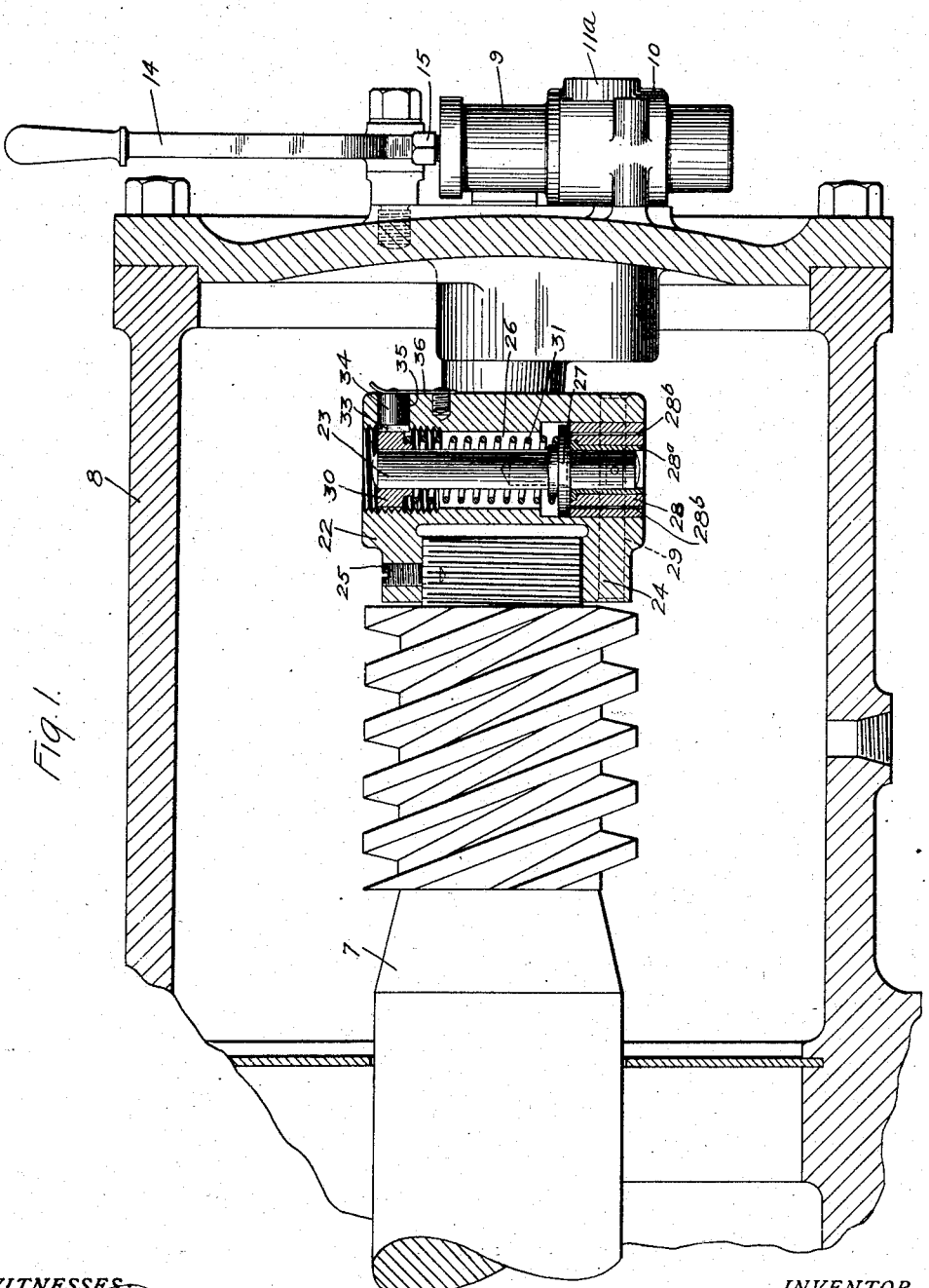

J. E. SNYDER.
AUTOMATIC STOP GOVERNOR.
APPLICATION FILED DEC. 18, 1909.
1,189,634.
Patented July 4, 1916.
3 SHEETS—SHEET 3.
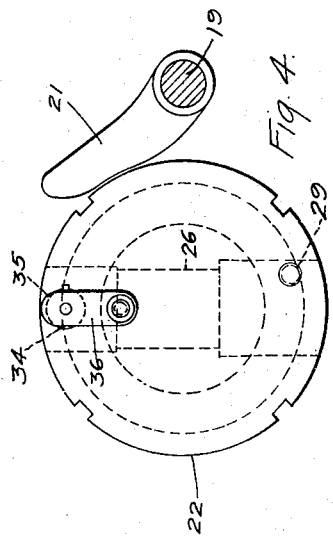
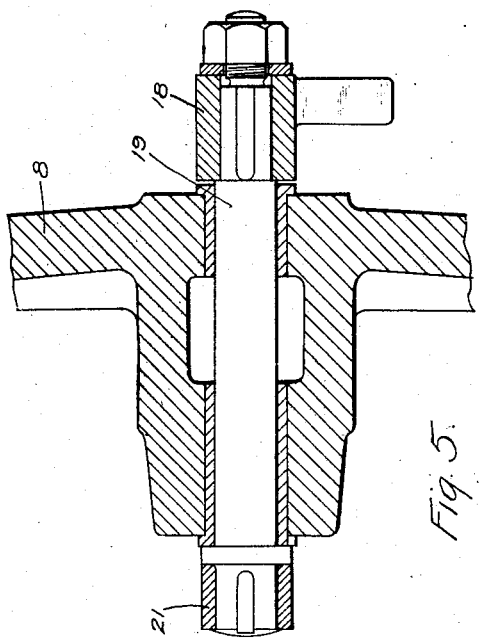
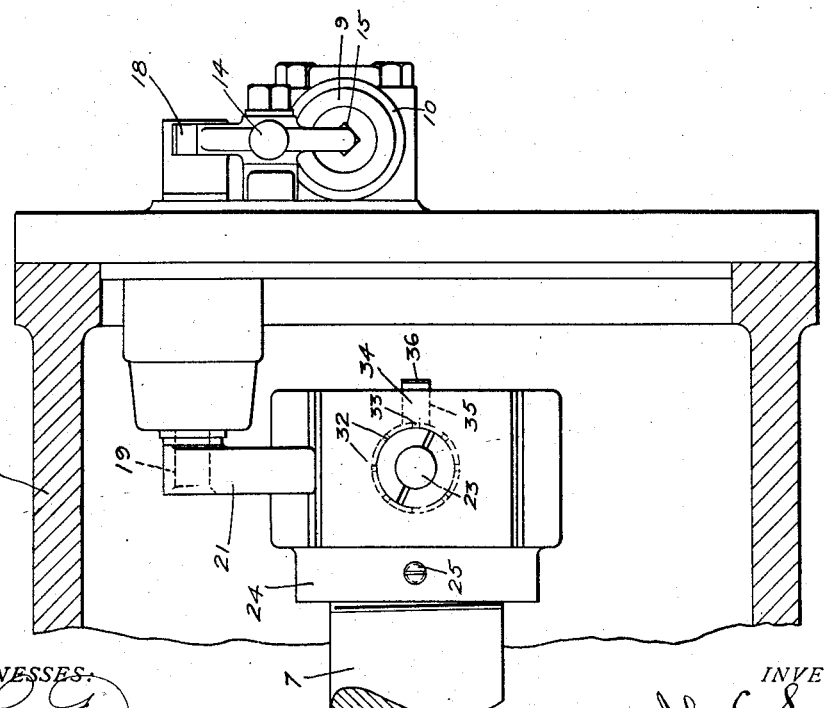
INVENTOR.
John E. Snyder
ATTORNEY IN FACT.

UNITED STATES PATENT OFFICE.

JOHN E. SNYDER, OF SWISSVALE, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

AUTOMATIC STOP-GOVERNOR.

1,189,634.  Specification of Letters Patent.  Patented July 4, 1916.

Application filed December 18, 1909. Serial No. 533,838.

*To all whom it may concern:*

Be it known that I, JOHN E. SNYDER, a citizen of the United States, and a resident of Swissvale, in the county of Allegheny and State of Pennsylvania, have made a new and useful Invention in Automatic Stop-Governors, of which the following is a specification.

This invention relates to governors and particularly to automatic stop or cut-off governors.

Elastic fluid turbines and all other types of fluid actuated engines are ordinarily provided with speed governors, the functions of which are to automatically proportion the supply of motive fluid to the engine in accordance with the load demanded and to maintain the speed of the engine practically constant. It is also customary to provide in addition to the speed governors, auxiliary or automatic stop governors. The only function of these governors is to act, under emergency conditions, and shut off the supply of motive fluid when the engine has exceeded a certain predetermined speed. As these governors operate only when the speed governor has failed to perform its function and is incapable of governing the speed of the engine, it is essential that they operate promptly and effectively to shut off the supply of motive fluid to the engine.

An object of my invention is, therefore, to produce a simple and effective cut off governor, which will act promptly and positively in performing its function. This and other objects I attain in the drawings accompanying this application and forming a part thereof. In the drawings I have illustrated an embodiment of my invention as applied to the shaft of an elastic fluid turbine and arranged to actuate a relay valve which controls the operation of a fluid-actuated cut-off valve of the turbine.

Figure 2:
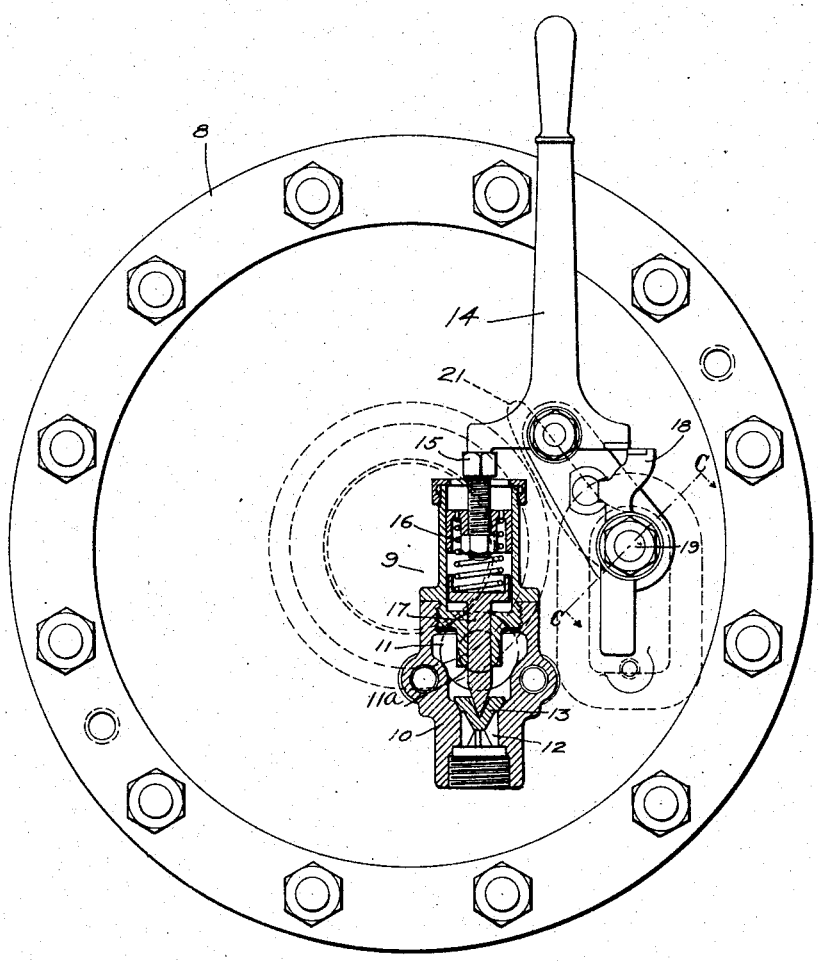

Figure 1 is a fragmental section of a housing inclosing one end of the turbine shaft and discloses in section an automatic stop governor embodying my invention. Fig. 2 is an end elevation of the housing shown in Fig. 1 in connection with a longitudinal section of a relay valve adapted to coöperate with the automatic stop governor; Fig. 3 is a partial section and a partial plan view of the apparatus shown in Fig. 1; Fig. 4 is an end view of a governor embodying my invention and shown in connection with a trip lever; and Fig. 5 is a section along the line C C of Fig. 2.

Referring to the drawings, the end of a turbine shaft 7 is inclosed within a housing 8 which is secured, in any suitable manner, to the turbine casing and on which a relay valve 9 and a controlling device for the valve are mounted.

The relay valve comprises a casing 10 which is divided into two chambers 11 and 12, and in which a valve disk 13 operates to open and close communication between the chambers. The chamber 12 is adapted to communicate, through suitable piping or passages, with the pressure chamber of a fluid actuated cut off valve, and the chamber 11 is adapted to communicate with the atmosphere through a port 11$^a$ (Figs. 1 and 2).

The valve disk 13 is held closed against the fluid pressure in chamber 12 by a, so-called, replacing lever 14 which operates through the adjusting bolt 15, a helical spring 16 and a valve stem 17. While the valve is closed fluid pressure is maintained in the chamber 12 and consequently in the pressure chamber of the cut off valve with which it communicates, and the cut off valve is consequently held open and caused to deliver motive fluid to the turbine. The lever 14 is held in place against the bolt 15 by a trip lever 18 and the lever 18 is mounted on a pin 19 which extends through the end of the housing 8 and is provided at its inner end with a finger 21 adapted to be engaged by the automatic stop governor during excessive speeds of the turbine. The trip lever 18 is arranged to release the replacing lever 14 and to thereby release the valve disk 13, when an excessive speed of the turbine causes the automatic stop governor to engage the finger 21.

By releasing the valve disk 13, communication is established between the chamber 11 and 12 and the chamber 12 and consequently the pressure chamber of the cut off valve are exhausted into the atmosphere and the cut off valve is caused to close and to cut off the flow of motive fluid to the turbine.

The governor consists of a cylindrical casing 22 which is secured to the end of the turbine shaft 7, and a pin 23, which is mounted in the casing and is capable of moving diametrically of the casing under the influence of centrifugal force. The casing is provided on one end face with a tapped lug 24, by means of which it is screwed onto the end of the shaft 7. A screw 25 extends through the casing 22 and engages the end of the shaft for the purpose of locking the casing in place on the shaft. This screw may, if desired, project into recesses provided at the end of the shaft.

The pin 23 is located in a cylindrical bore 26 which extends diametrically through the casing and which is counterbored at one end to a larger diameter, for the purpose of receiving the pin. The pin is provided with a head 27 of increased diameter which is located within the counterbored portion of the bore 26. The head 27 is secured in place by means of a balancing plug 28 provided with a bush 28ᵃ and located in the counterbore and secured in place by means of a pin 29 which extends transversely through the plug and is riveted over at each end of the casing.

Projecting from the head 27 is a tail piece or pin which is guided in the bush 28ᵃ. The space between the plug 28 and the end of the counterbore permits of sufficient play of the head 27 to allow the escape of oil or other matter through the openings 28ᵇ in the plug 28.

The smaller end of the bore 26 is tapped to receive a screw plug 30 through which the end of the pin 23 is adapted to project. The plug 30 besides acting as a guide for the pin 23, forms an adjustable abutment for a helical spring 31 which surrounds the pin 23 and is located between it and the head portion 27 of the pin. The tension of the spring 31 is adjusted by screwing the plug 30 into or out of the bore 26. Longitudinally extending slots 32 are cut across the threaded face of the plug 30 and are adapted to be engaged by a tongue 33 formed on a key 34. The key 34 projects into an aperture 35 provided in one end of the casing 22 and is held in place, in the aperture, by means of a spring 36 which is secured to the casing. In adjusting the tension of the spring the plug 30 is turned until the tongue 33 of the key 34 engages one of the slots 32 and it is then held securely in place.

The pin 23 is so constructed that, when in place in the casing, its center of gravity falls eccentrically of the shaft 6 and in line with the axis of the bore but nearer the open end of the bore. Under such conditions, the centrifugal force, due to the rotation of the pin, tends to move the pin longitudinally of itself or diametrically of the casing, in opposition to the pressure of the spring 31.

When the centrifugal force is sufficient to overcome the tension of the spring, the pin moves, during its rotation, to occupy different positions along the bore 26 for the different speed encountered. That is to say, the plug 30 can be adjusted to cause variable tension of the spring so that the pin will move at any predetermined speed. Inasmuch as the center of gravity of the pin is eccentric to the shaft 7 (that is, the forward end of the pin in its direction of travel), it follows that the pin will remain inactive under normal speeds. Just as soon as the rotative speed of the shaft exceeds the determined maximum speed, the centrifugal force exerted upon the weighted end of the pin will cause an instantaneous movement thereof to effect the automatic actuation of the trip. Thus it will be seen that the trip will be highly sensitive and reliable for any speed previously determined. At some predetermined speed the centrifugal force is sufficient to cause the end of the pin to project beyond the peripheral face of the casing 22 and to engage the trip finger 21.

The arrangement is such that when the finger 21 is engaged by the pin 23 it, turning about its pivotal point, turns the pin 19, and, by turning the lever 18, releases the lever 14 and thereby releases the valve disk 13.

The valve disk 13 when released is actuated by the fluid pressure in the chamber 12 to open communication between the chamber 12 and the chamber 11 and to discharge the fluid pressure from the pressure chamber of the fluid actuated cut off valve, and to thereby cause the cut off valve to close and shut off the supply of motive fluid to the turbine. The arrangement of the tripping device is such that it must be manually reset before motive fluid is again supplied to the engine.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. The combination of a rotating shaft, a casing secured to the end of the shaft and rotatable with the shaft, and having a bore which extends diametrically with relation to the shaft, a weight or pin located within the bore of the casing and extending diametrically across the end of the shaft, a coiled spring located within the casing and surrounding the pin, a screw plug screwed into the end of the casing and through which the pin projects and forming an adjustable abutment for the spring, and means for locking said plug against rotation relatively to said casing.

2. A revolving member having a recess extending at right angles to its axis of rotation, in combination with a pin, located within and movable along said recess, an opposing spring located within said recess and engaging said pin, and a holder for said spring screwed into the end of said recess and forming a guide for said pin.

In testimony whereof, I have hereunto subscribed my name this 14th day of December, 1909.

JNO. E. SNYDER.

Witnesses:
C. W. McGHEE,
C. H. McCONNELL.

Copies of this patent may be obtained for five cents each, by addressing the "Commissioner of Patents, Washington, D. C."